Nov. 14, 1939.   F. S. HODGMAN   2,180,205
POSITIONAL CONTROL MOTOR
Filed March 24, 1937
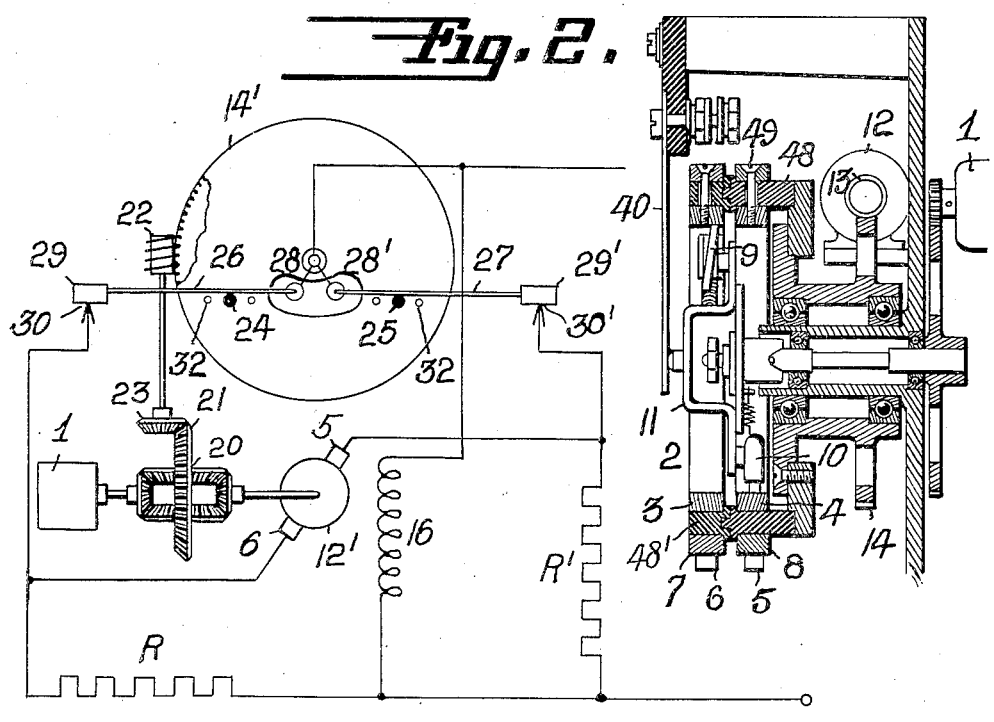
Fig. 3.
Fig. 2.
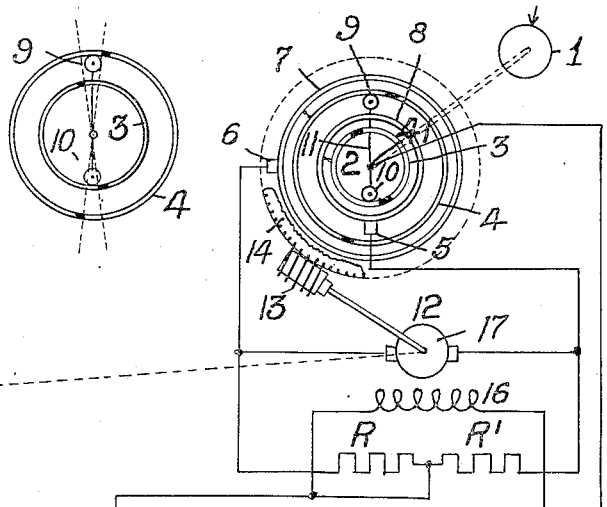
Fig. 4.
Fig. 1.
INVENTOR
FREDERICK S. HODGMAN
BY
Herbert P. Thompson
HIS ATTORNEY.

Patented Nov. 14, 1939

2,180,205

UNITED STATES PATENT OFFICE 2,180,205

POSITIONAL CONTROL MOTOR

Frederick S. Hodgman, Glen Rock, N. J., assignor to Sperry Gyroscope Company, Inc., Brooklyn, N. Y., a corporation of New York Application March 24, 1937, Serial No. 132,713
In Japan September 13, 1935

9 Claims. (Cl. 172—239)

This invention relates to electrical positional or follow-up control systems wherein a power motor is used to drive a member, such as an indicator card, computing device, or the like, into positional agreement with a controlling element of small power. More particularly, my invention relates to a design of reversible electric motor for driving a controlled element, wherein the windings are such as to bring the motor to rest practically instantaneously and without overshooting or hunting when the position of coincidence is reached.

This application contains matter divided from my copending application, now Patent No. 2,131,951, dated October 4, 1938, for Automatic steering devices for ships, and additional matter and is therefore a continuation or division in part thereof.

Referring to the drawing,

Fig. 1 is a wiring diagram showing one form my invention may assume.

Fig. 2 is a wiring diagram showing a modified form of controller.

Fig. 3 is a vertical section through the controller of Fig. 1, showing further mechanical details.

Fig. 4 is a diagram showing the effect of adjusting the relative position of the split rings of the controller.

In the drawing, the sending device or controlling element is not shown, but is represented as actuating a repeater motor 1 which operates the reversing controller 2 at the receiving instrument, which is shown in a plan projected form in Fig. 1 and in greater detail in Fig. 3. This controller is shown as comprising a pair of split contact rings 3 and 4, the dead sectors of which are preferably slightly displaced, angularly. To each ring current is continuously supplied from collector brushes 5 and 6 bearing on collector rings 7 and 8, which are connected respectively to half of each of contact rings 3 and 4. As shown in Fig. 3, the split rings may be placed inside insulating sleeves 48 and 48' and the collector rings outside, being held together by set screws 49 passing through slots in said sleeve. Cooperating with said contact rings are brushes or trolleys 9 and 10 on a rotatable arm 11, which is shown as turned from the repeater motor 1, and to which one side of the supply is connected through spring contact 49.

The power motor 12, in circuit with said controller, is shown as having a follow-back connection to the controller through the worm 13 on the motor shaft and worm wheel 14, which rotates the slip rings and contact rings. The motor also operates, directly or indirectly, the driven element, which is shown as in the form of an indicator card 15, but it is obvious that this may be any member which it is desired to drive in synchronism with the controlling element, and which has more or less inertia.

The motor 12 is shown as provided with a continuously excited field winding 16 and the armature 17 as directly connected across the collector brushes 5 and 6, which bear on the collector rings 7 and 8. With the trolleys in the positions shown in Fig. 1, current will tend to flow from the plus side of the line through trolley 10, brush 5, through armature 17 from right to left, and one side R of the mid tapped resistances R, R' to the minus side of the line. Another part of the current would flow through R' to the minus side of the line. However, current would also tend to flow from the plus side of the line through the trolley 9, brush 6, through armature 17 from left to right, and through equal resistance R' to the minus side of the line, and another part would flow through R to the minus side of the line. Therefore no line current would flow through the armature, since its brushes are at equal potentials. Also, it should be observed that there is a permanent dynamic braking circuit connection from the armature through resistances R and R' arranged in series, and also, in the position of the arm 11 shown in Fig. 1, the armature is short-circuited through brush 5, trolley 10, trolley 9, brush 6 and back to the other side of the armature. Therefore, the armature will be very quickly brought to rest by dynamic braking as soon as this position is reached by the controller. If, however, the trolleys are turned through a small angle in a clockwise direction, say, the circuit from trolley 9 is broken so that current will flow unopposed from trolley 10 and brush 5 through the armature and resistance R. In case of slight rotation in the opposite direction, the circuit from trolley 10 will be broken and current will flow in the opposite direction through the armature and resistance R'.

With my design and when a small motor 12 is used with small load, the armature may be brought to rest from a speed of more than 1000 R. P. M. within 1 revolution of the armature. By this arrangement, also, the effective dead space of the controller may be adjusted by slightly turning one of the contact rings 3 or 4 with respect to the other. This may be readily accomplished by loosening one of screws 49 and turning one of the rings and retightening the same, or by turning ring 48' on 48. Fig. 4 shows the rings adjusted for less dead space than Fig. 1.

In Fig. 2, I have shown a slight modification of the form of controller used. In this figure, the differential drive of the controller from both the controlling element and the power motor is obtained through a differential gear instead of through revolving both parts of the controller. The repeater motor 1 is shown as operating through one side of a differential 20, while the power motor 12' operates on the other side of the differential, the central arm being provided with a bevel gear 21 to turn a worm 22 through a bevel gear 23, said worm turning the worm wheel 14' on the controller. Said worm wheel is shown as a disc carrying a pair of spaced pins 24 and 25 which normally bear lightly against a pair of spring arms 26 and 27 clamped at their inner ends to fixed pins 28 and 28'. The contacts 29 and 29' on said arms both normally rest on cooperating contacts 30 and 30' so as to keep the same closed, but in case the worm wheel turns in one direction or the other, one of said contacts is broken. Said contacts are placed in circuit with the motor 12' in the same manner as the trolleys 9 and 10, the windings of the motor being the same in principle. The dead space or lost motion in this form of controller is varied by altering the bias placed on spring arms 26 and 27 or by shifting the position of pins 24 and 25 to auxiliary holes 32 in disc 14'.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an electrical positional control system, the combination with the controlling and the following element and a reversible motor for driving the latter, a pair of reversing contacts movable with one element, a third contact on the other adapted to move from one to the other contact and in its mid position to bridge both of said reversing contacts, said motor having separate armature and field circuits, the latter of the continuously excited type, a center tapped resistance, and an electrical supply having one side connected to the center tap of said resistance and the other side to said third contact, said armature being connected across said contacts and across said resistance, so arranged that the armature is short-circuited when said elements are in positional agreement, while upon relative displacement between said elements current is caused to flow through the armature in such a direction as to cause the motor to restore synchronism.

2. In an electrical positional control, the combination with a controlling and controlled elements, of a reversible motor for the latter having its armature terminals each permanently connected through a resistance to the same side of a source of supply, a pair of contact members electrically connected respectively to the armature terminals of said motor, and relatively movable contact means actuated in response to relative movements of said elements and connected to the other side of said source of supply and arranged for selectively engaging and disengaging said contact members to effect the operation of said motor in either direction, said contact means also engaging both of said contact members to effect the shutting off of the current supply to said motor armature, while simultaneously providing a short circuit path for said armature to obtain immediate stoppage of said controlled element.

3. In a positional control system, a controller comprising a pair of oppositely disposed semicircular contact rings of different radius spaced from each other, a relatively rotatable contact for each ring, the two rings being slightly unsymmetrically placed with respect to their contacts, and a reversible motor controlled from said rings and contacts, having a continuously excited field and the armature connected across said rings, whereby the armature is dynamically braked when said contacts lie on both rings.

4. A positional control system as defined in claim 2, wherein said movable contact means comprises contacts carried by spring arms and a disc operated differentially from said controlling and controlled elements and carrying pins for actuating said spring arms.

5. In an electrical follow-up system, a source of current supply, a motor having field and armature windings the former of which is of the continuously excited type, resistances permanently connected in series across the armature and to one side of the supply, a three position single pole switch having its center member connected to the other side of the supply and its side members to the junctions of said armature and said resistors and adapted to pass current in one or the other direction through said armature and resistances, said switch members in the neutral or standstill position completing a short circuit around said armature to brake the motor dynamically.

6. In an electrical follow-up system, a source of current supply, a motor having field and armature windings the former of which is continuously excited from a supply, a resistance permanently connected across the armature with its midpoint connected to one side of the supply, a three position single pole contacting device having its center member connected to the other side of said supply, and adapted in one position to send current from one side of the supply through the armature and resistance to the other side, and in the other position to send current from said side of the supply in opposite direction through the armature and in like direction through the resistance to said other side of the supply, and in its mid or standstill position to short circuit said armature to bring the motor very quickly to rest without hunting.

7. In an electrical positional control system, the combination with the controlling and the following element and a reversible motor for driving the latter, a pair of reversing contacts movable with one element, a third contact on the other adapted to move from one to the other contact and in its mid position to bridge both of said reversing contacts, said motor having separate armature and field circuits, the latter of the continuously excited type, a center tapped resistance, said armature being permanently connected across said reversing contacts and across the free ends of said resistance, an electrical supply having one side connected to said first named contact and the other side to the center tap of said resistance, such that when said elements are in positional agreement, said armature is short-circuited, while upon relative displacement of said elements from positional agreement, said short circuit is interrupted and current allowed to flow through the armature in the direction to restore synchronism.

8. In an electrical positional control system, the combination with a controlling and a following element and a reversible motor for driving the latter, having its armature terminals each permanently connected through a resistance to the same side of an electric current supply, a pair of contact members electrically connected respectively to said terminals, a third contact member connected to the other side of said supply and adapted to bridge said pair of contacts to short circuit said armature, and means actuated by a change in the relative position of said elements for breaking the contact between said third contact member and one or the other of said pair of contact members, whereby said motor will be driven in the direction to restore positional correspondence between said elements and stopped substantially instantly when said contact members are bridged.

9. In an electrical positional control system, the combination with the controlling and the following element and a reversible motor with separately and continuously excited field for driving the latter, a pair of make and break switches differentially connected with both of said elements, an electric current supply having one side connected to the center tap of a resistance connected across the armature and across one part each of said pair of switches, and the other side connected to the other part each of said switches, said switches being held normally closed by springs when said elements are in positional agreement so that said armature is short-circuited, while positional relative displacement causes one or the other switch to open to allow current to flow through the armature in a direction to cause rotation of the motor to restore synchronism.

FREDERICK S. HODGMAN.